(12) United States Patent
Koehle et al.

(10) Patent No.: US 9,883,169 B2
(45) Date of Patent: Jan. 30, 2018

(54) OPTICAL SYSTEM, APPARATUS AND METHOD FOR OPERATING AN APPARATUS USING HELMHOLTZ RECIPROCITY

(71) Applicant: Sony Corporation, Tokyo (JP)

(72) Inventors: Roderick Koehle, Munich (DE); Markus Kamm, Karlsruhe (DE)

(73) Assignee: SONY CORPORATION, Tokyo (JP)

( * ) Notice: Subject to any disclaimer, the term of this patent is extended or adjusted under 35 U.S.C. 154(b) by 255 days.

(21) Appl. No.: 14/666,817

(22) Filed: Mar. 24, 2015

(65) Prior Publication Data
US 2015/0281676 A1 Oct. 1, 2015

(30) Foreign Application Priority Data
Mar. 31, 2014 (EP) .................................. 14001195

(51) Int. Cl.
*H04N 13/02* (2006.01)
*G06T 7/593* (2017.01)
*H04N 13/00* (2006.01)

(52) U.S. Cl.
CPC .......... *H04N 13/0253* (2013.01); *G06T 7/593* (2017.01); *H04N 13/0207* (2013.01); *H04N 2013/0081* (2013.01)

(58) Field of Classification Search
CPC ........... H04N 13/0253; H04N 13/0207; H04N 5/2256; H04N 2013/0081; G06T 7/593
USPC ........................................................ 348/370
See application file for complete search history.

(56) References Cited

U.S. PATENT DOCUMENTS

| | | | |
|---|---|---|---|
| 2005/0074162 A1* | 4/2005 | Tu ........................... | G06T 7/593 382/154 |
| 2008/0123937 A1* | 5/2008 | Arias Estrada ......... | G06T 7/593 382/154 |
| 2009/0185173 A1 | 7/2009 | Ashdown et al. | |
| 2010/0328677 A1* | 12/2010 | Debevec ................ | G01N 21/55 356/600 |

OTHER PUBLICATIONS

Pradeep Sen, et al., "Dual Photography", ACM SIGGRAPH 2005, Conference Proceedings, pp. 1-11.
Todd Zickler, et al., "Helmholtz Stereopsis: Exploiting Reciprocity for Surface Reconstruction", Appears in Proc. ECCV 2002, 15 pages.

* cited by examiner

*Primary Examiner* — Nhan T Tran
(74) *Attorney, Agent, or Firm* — Oblon, McClelland, Maier & Neustadt, L.L.P.

(57) ABSTRACT

An optical system includes an illumination unit and an imaging unit configured to image a scene including at least one object into a first image and a second image by using Helmholtz reciprocity. The illumination unit is configured to emit light into at least one light emitting solid angle and the imaging unit is configured to receive light from a light receiving solid angle. The light receiving solid angle is at least as large as each of the light emitting solid angles.

13 Claims, 10 Drawing Sheets

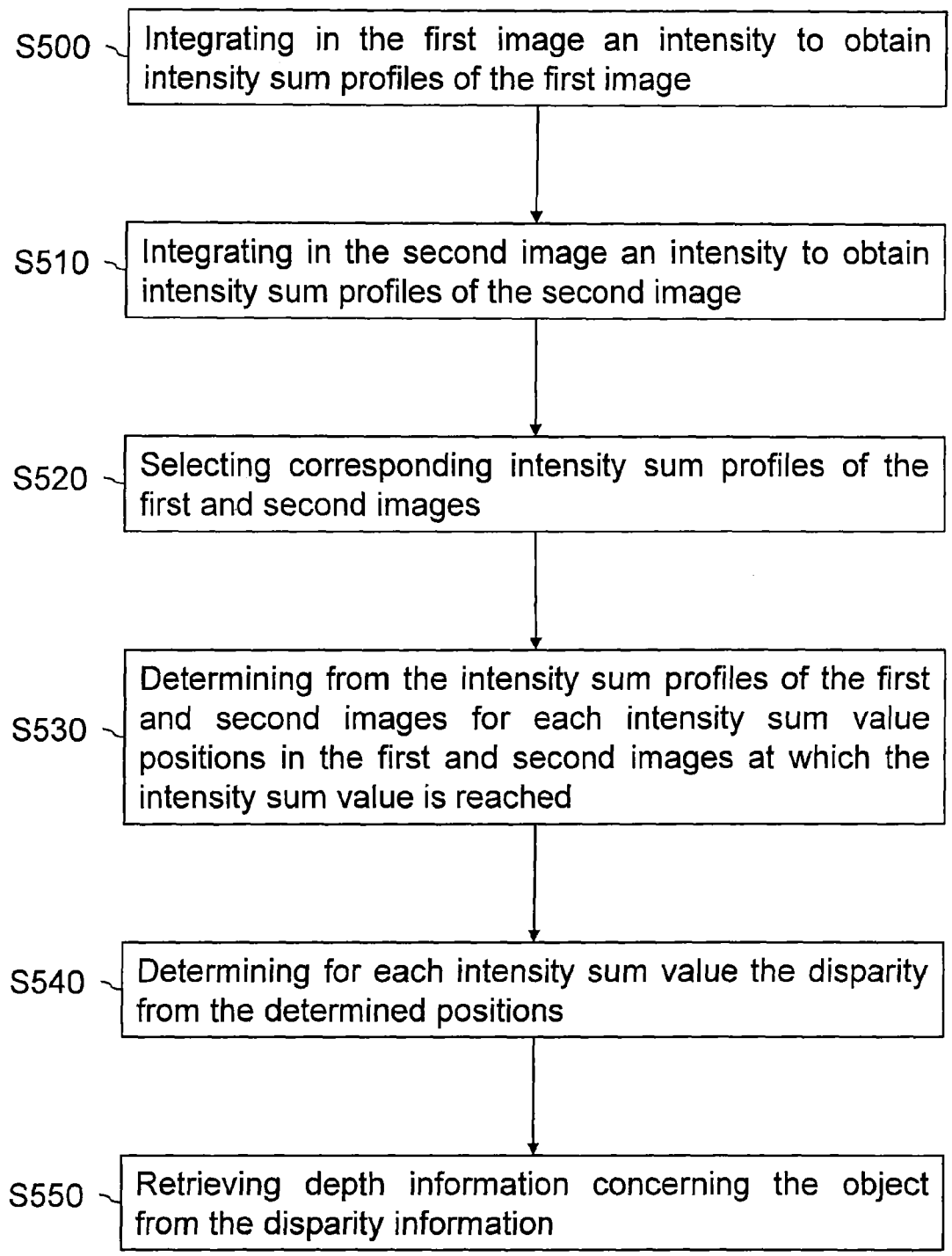

OPTICAL SYSTEM, APPARATUS AND METHOD FOR OPERATING AN APPARATUS USING HELMHOLTZ RECIPROCITY

BACKGROUND

The present disclosure relates to an optical system configured to capture a scene using Helmholtz reciprocity. The disclosure further relates to an apparatus comprising an optical system as well as to a method of operating an apparatus comprising the optical system.

DESCRIPTION OF RELATED ART

Stereoscopic imaging systems reconstruct three-dimensional depth information from two or more images of an object captured at different viewing angles. Typically, the resolution of the depth information is low and elaborate computations obtain the depth information from the two-dimensional images. Common approaches for depth acquisition are passive stereoscopic imaging, fringe projection and structured light. Stereoscopy uses at least two pairs of camera images separated by a baseline and after an image rectification step, the scene depth is acquired by matching scene features along corresponding epipolar lines. The resulting disparity measuring the pixel offset of related scene features is a reciprocal measure of the depth. Stereoscopy relies on the availability of scene features and fails for scene objects with homogeneous or grating like texture and assumes the measurement object to have diffuse reflection properties.

Fringe projection methods utilize a light projector, which is used to project a line or dot grid pattern into the scene. By means of the pattern projection, fringe projection extends the applicability of stereoscopy to surfaces with homogeneous texture. Since usually a repetitive pattern is used, one requirement of the fringe projection is that the surface should be sufficiently smooth. If discontinuous surfaces with large height steps are used, grating or phase ambiguities arise and a unique disparity assignment may not be possible. Structured light generalizes the concept of fringe projection and uses time multiplexing to assign a unique time multiplexed encoding pattern to overcome the phase ambiguity limitations imposed by the fringe projection technique.

Other methods propose utilizing Helmholtz reciprocity for depth detection, as the resulting stereoscopic image pair satisfies a partial differential relation, which allows the recovery of the surface profile of an imaged object being independent of object reflectance and texture. Recovering the depth by means of a partial differential equation is based on boundary conditions to obtain a unique solution. In addition, at object boundaries and rapid changes in depth singularities of the derivative of the depth occur, which may prevent finding a solution for general scenes. There is a need for improved optical systems providing depth information. The object of the present embodiments is achieved by the subject-matter of the independent claims. The dependent claims define further embodiments.

SUMMARY

The forgoing paragraphs have been provided by way of general introduction and are not intended to limit the scope of the following claims. The described embodiments, together with further advantages, will be best understood by reference to the following detailed description taken in conjunction with the accompanying drawings.

According to an embodiment an optical system includes an illumination unit and an imaging unit configured to capture a scene including at least one object into at least a first image and a second image by using Helmholtz reciprocity. The illumination unit is configured to emit light into at least one light emitting solid angle. The imaging unit is configured to receive light from a light receiving solid angle. The light receiving solid angle is at least as large as each of the light emitting solid angles.

According to another embodiment an apparatus includes an optical system with an illumination unit and an imaging unit configured to image a scene including at least one object into at least a first image and a second image by using Helmholtz reciprocity. The optical system further includes a computing unit configured to obtain a disparity information concerning the first image and the second image on the basis of a comparison of intensity sum values along corresponding lines in the first image and the second image and is further configured to retrieve depth information concerning the object from the disparity information.

Another embodiment relates to a method for operating an apparatus including an optical system. A scene including at least one object is imaged into at least a first image and a second image by using Helmholtz reciprocity. Disparity information concerning the first image and the second image is obtained on the basis of a comparison of intensity sum values along corresponding lines in the first image and the second image. Depth information concerning the object is retrieved from the disparity information.

BRIEF DESCRIPTION OF THE DRAWINGS

In the following drawings, like reference numerals designate identical or corresponding parts throughout the several views. The elements of the drawings are not necessarily to scale relative to each other. Features of the illustrated embodiments can be combined with each other perform yet further embodiments.

FIG. 5 is a schematic flow chart of a method for retrieving depth information by using Helmholtz reciprocity according to an embodiment.

DESCRIPTION OF THE EMBODIMENTS

Figure 1A:
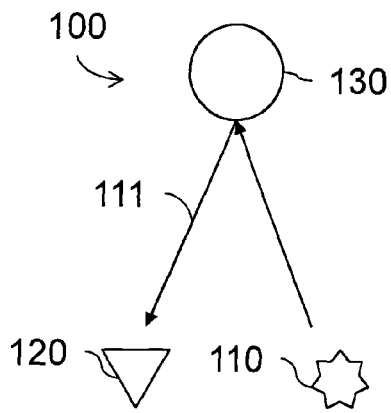
FIGS. 1A and 1B are schematic block diagrams of an optical system imaging a scene by using Helmholtz reciprocity according to an embodiment.
Figure 1B:
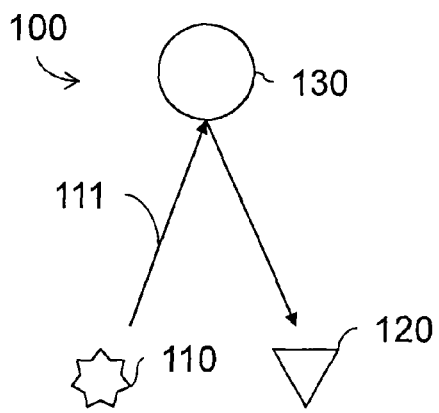

FIGS. 1A and 1B illustrate an optical system 100 that includes at least one illumination unit 110 and at least one imaging unit 120. The illumination unit 110 illuminates a scene including at least one object 130. For example, the scene may include objects 130 located in front of a screen, which are illuminated in order to obtain depth profiles of the objects 130. Such a setup may for example be used to inspect workpieces or tools used in industrial applications. According to another embodiment the scene may be a room in which an entertainment system such as a game console or a television is located. Then, objects 130 within the scene, e.g. furniture or persons within the room, are illuminated to detect distances between the objects and the illumination unit 110. From the detected distances a position of the illumination unit 110 may be determined, which is used to control the entertainment system.

The illumination unit 110 may be any light source suitable for illuminating the scene to be captured, for example an LED or an array of LEDs, an incandescent lamp, a gas discharge lamp, a fluorescent lamp or multiple of such lamps or any combination thereof.

The imaging unit 120 captures the light reflected from the object 130 and takes an image of the scene with the object 130. The imaging unit 120 may be any device suitable for capturing images, for example a digital camera, such as a CCD (charge coupled device) camera or an active pixel sensor including a CMOS (complementary metal oxide semiconductor) camera.

In FIG. 1A the illumination unit 110 is arranged at a first illumination position and the imaging unit 120 is arranged at a first imaging position. When the illumination unit 110 illuminates the object 130 and the imaging unit 120 receives the light reflected from the object 130, the imaging unit 120 captures a first image of the scene.

In FIG. 1B the illumination unit 110 is arranged at a second illumination position and the imaging unit 120 is arranged at a second imaging position. When the illumination unit 110 illuminates the object 130 from the second illumination position and the imaging unit 120 receives the light reflected from the object 130, the imaging unit 120 captures a second image of the scene including the at least one object 130.

By selecting the first illumination position close to the second imaging position and the second illumination position close to the first imaging position light rays 111 emitted from the illumination unit 110 and reflected at the same point of the object 130 travel approximately on the same path during the capture of the first image and the second image, but with inverted directions. In this case, Helmholtz reciprocity applies and the bidirectional reflectance distribution function (BRDF) is the same for light emitted from the first illumination position and captured at the first imaging position and for light emitted from the second illumination position and captured at the second imaging position. In this case, depth reconstruction is possible without knowledge of the BRDF.

The illumination unit 110 may emit light into at least one light emitting solid angle, i.e. into a light cone defined by the solid angle at the apex at the illumination unit 110. The imaging unit 120 captures objects, which reflect light into a light receiving solid angle, i.e. a cone defined by the solid angle at the apex at the imaging unit 120. The light receiving solid angle of the imaging unit 120 is at least as large as each of the light emitting solid angles of the illumination unit 110.

In FIGS. 1A and 1B the positions of the illumination unit 110 and the imaging unit 120 are exchanged. Hence, the first illumination position and the second imaging position perfectly coincide and the second illumination position and the first imaging position perfectly coincide, too. The optical system 100 can therefore make use of Helmholtz reciprocity when retrieving depth information about objects in the captured scene.

Figure 1C:
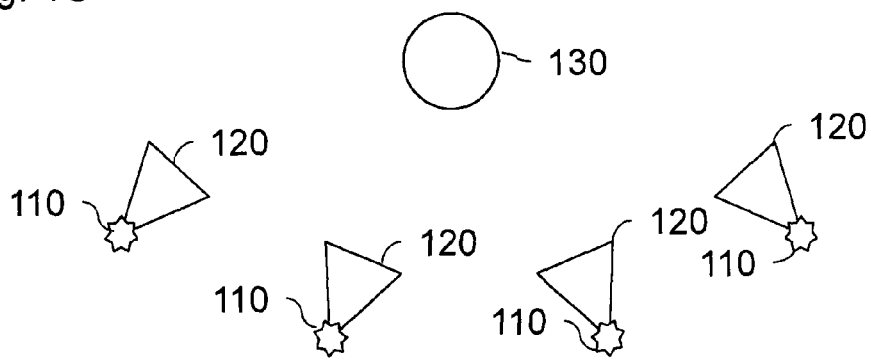
FIG. 1C is a schematic block diagram of an optical system imaging a scene by using Helmholtz reciprocity according to another embodiment.

Another embodiment as illustrated in FIG. 1C may provide an optical system with N pairs of illumination units 110 and imaging units 120 to image the scene into ½ N (N−1) pairs of images. Each of these image pairs may be considered as the first image and the second image as described above with reference to FIGS. 1A and 1B. For each of the image pairs the Helmholtz reciprocity condition applies. A multi-view Helmholtz imaging setting captures the scene and its objects 130 from more than two positions. In the captured image pairs different parts of the scene are occluded and/or shadowed because of the different perspectives such that for the occluded/shadowed regions point cloud modeling may be applied, which produces a three dimensional model of the objects 130 from the image pairs captured from different perspectives.

Another embodiment concerns an approximate use of Helmholtz reciprocity, wherein the first illumination position only approximately coincides with the second imaging position and/or the second illumination position only approximately coincides with the first imaging position. Then Helmholtz reciprocity holds still to a sufficient degree at least for points of an object that are located at a surface of the object facing the imaging positions. For example, the Helmholtz reciprocity may hold to a sufficient degree in an optical system that includes one imaging unit and several illumination units located close to the imaging unit and alternately illuminating the object. The illumination units may be arranged symmetrically around the imaging unit. According to another embodiment the optical system using approximate Helmholtz reciprocity includes one illumination unit surrounded by several imaging units.

The optical system 100 may also be operated if other light sources than the illumination units 110 are present. In this case the light emitted from the light source may be subtracted by an ambient light subtraction method. To this end, the scene is imaged by the at least one imaging unit 120 without illumination from the illumination unit 110. The light intensity captured in these images is subtracted from the light intensities of the first image and the second image which are captured while the scene is illuminated by the illumination unit 110 to correct for the ambient light. According to other embodiments any other of the commonly known methods of ambient light subtraction may be used.

Figure 2:
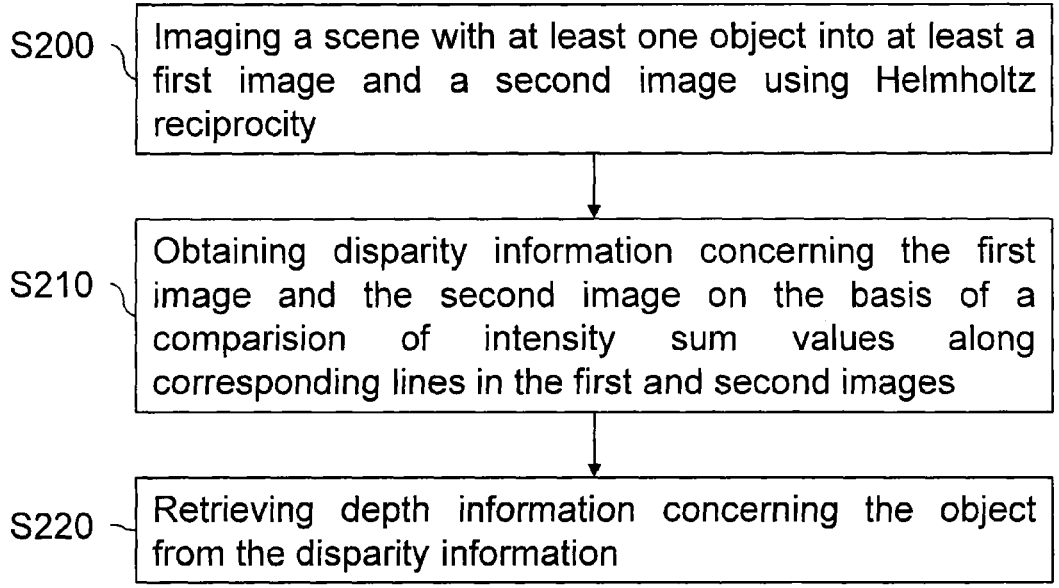
FIG. 2 is a schematic flow chart of a method of operating an apparatus including an optical system using Helmholtz reciprocity according to an embodiment.

From the first image and the second image captured by the optical system 100, depth information concerning the object may be obtained according to a method as illustrated in FIG. 2.

At S200 a scene with at least one object is imaged into at least a first image and a second image using Helmholtz reciprocity. According to an embodiment, imaging is performed with the optical system of FIGS. 1A and 1B. According to another embodiment step S200 may be performed by any optical system configured to image at least two images using Helmholtz reciprocity, for example by an array of N imaging units which image the scene from N different perspectives in order to obtain a set of ½ N (N−1) pairs of first images and second images.

At S210 disparity information concerning the first image and the second image is obtained on the basis of a comparison of intensity sum values along corresponding lines in the first and second images. Disparity information may be any information concerning the disparity between the first image and the second image. In the field of stereopsis or stereoscopy, disparity may refer to the difference in appearance of an object viewed from two different positions. Disparity may be measured as a distance, e.g. in meters, between image points if the first and second image are overlaid or by using angular differences measured, e.g., in degrees or radians.

At S220 depth information concerning the object is retrieved from the disparity information. The depth information may be any information about the three-dimensional shape of the object, such as its contour, its surface texture and its height profile along a direction perpendicular to the image planes of the first image and/or the second image. The depth information of the object may be obtained from the disparity, e.g., by triangulation. For example, a first image and a second image of an object are captured by imaging units, which are separated by a distance P, have parallel focal planes and a focal length F. The disparity D of a point of the object is the distance between locations of the point in the first image and the second image. The distance Z of the point from the focal plane of the imaging units, i.e. its depth information, is then $Z=(PF)/D.$ According to an embodiment, the apparatus of FIG. 3A performs the method as illustrated in FIG. 2. The apparatus may include an optical system 300 and a computing unit 390. The computing unit 390 and the optical system 300 may be integrated in the same housing. According to another embodiment the computing unit 390 and the optical system 300 are arranged in different housings and the computing unit 390 may be connected to the optical system 300 through a cable connection or a wireless connection, e.g. by radio communication.

Figure 3A:
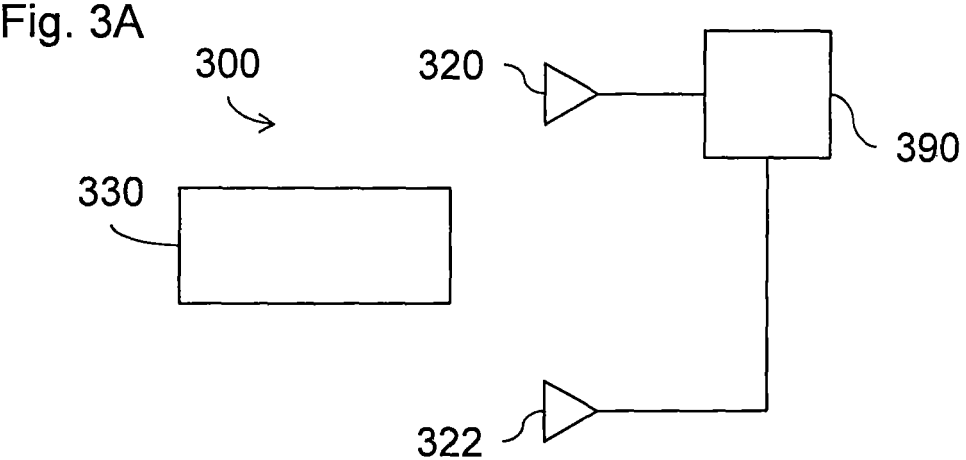
FIG. 3A is a schematic block diagram of an apparatus including an optical system using Helmholtz reciprocity according to another embodiment.
Figure 3B:
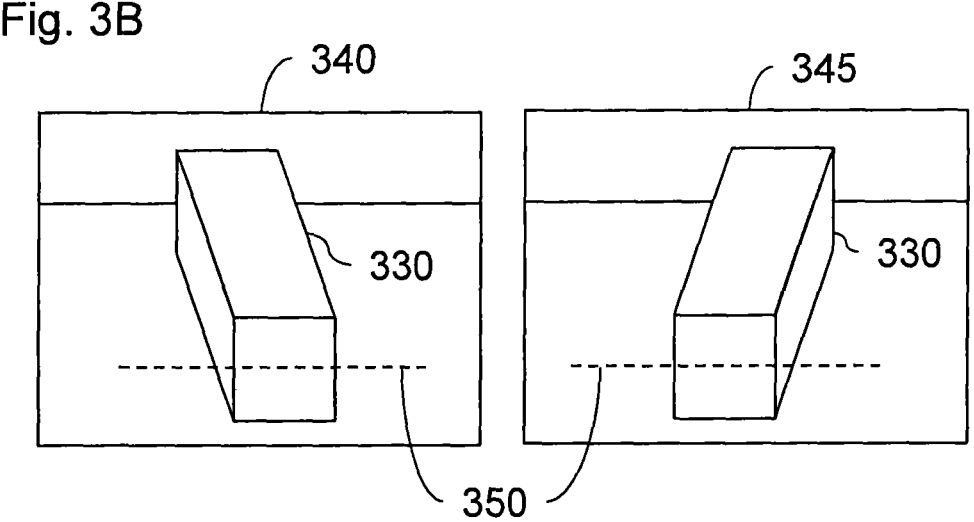
FIG. 3B schematically illustrates images imaged by the apparatus of FIG. 3A.

The optical system 300 includes an illumination unit and at least one imaging unit 320 used to capture a first image 340 and a second image 345 of a scene including at least one object 330 as illustrated in FIG. 3B. According to an embodiment, the imaging unit 320 may be repositioned after capturing the first image 340, as illustrated in FIGS. 1A and 1B, in order to image the second image 345. According to another embodiment illustrated in FIG. 3A one or more further imaging units 322 may be provided in addition to the imaging unit 320 in order to capture the second image 345. If more than one imaging unit 320 is used for capturing the images, it may suffice to arrange an illumination unit close to each imaging unit such that Helmholtz reciprocity can be maintained.

After capturing the first image 340 and the second image 345, the optical system 300 transfers image data describing the first image 340 and the second image 345 to the computing unit 390. The computing unit 390 obtains disparity information concerning a position of the object 330 in the first image 340 and the second image 345 on the basis of a comparison of intensity sum values along corresponding lines in the first and second images 340, 345. From the disparity information the computing unit 390 retrieves depth information concerning the object 330.

The corresponding lines are lines within each image that refer to the same points of the object 330. In FIG. 3B two examples of such corresponding lines 350 run across the front face of the object 330. Only one line is illustrated for each of the first image 340 and the second image 345. Each line in the first image 340 has a corresponding line in the second image 345 such that lines within the first image 340 can be mapped to corresponding lines in the second image 345 and vice versa. The lines may be horizontal ones, wherein the horizontal direction is defined by a connection line between the imaging and illumination units. According to another embodiment, the lines may be tilted at any arbitrary angle less than 90 degree with respect to the horizontal lines. One example of such corresponding lines are epipolar lines.

Figure 4A:
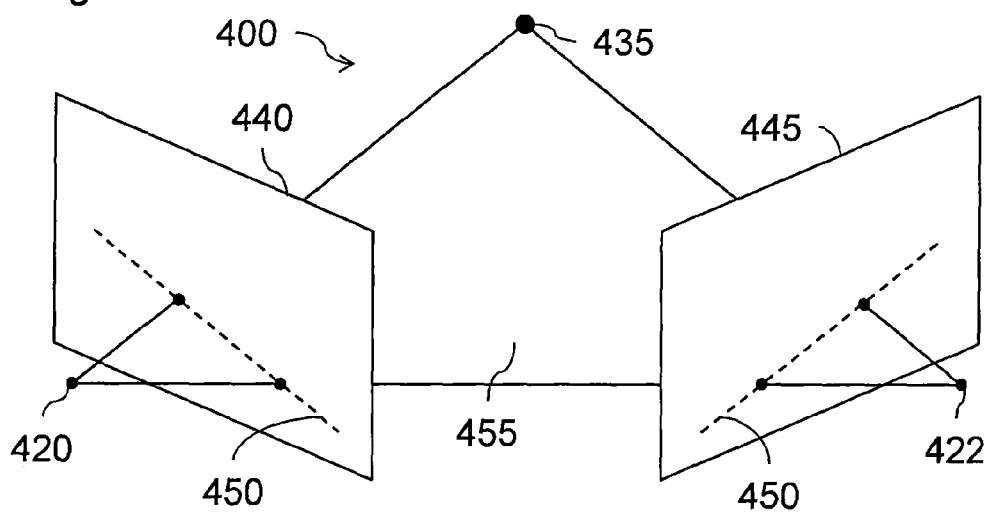
FIG. 4A is a schematic diagram for illustrating epipolar geometry for discussing effects of the embodiments.

FIG. 4A schematically illustrates corresponding epipolar lines 450 within a first image 440 and a second image 445 according to a schematic illustration of epipolar geometry 400.

The imaging unit 420, the at least one further imaging unit 422 and a point 435 of the object span an epipolar plane 455. The epipolar plane 455 virtually intersects the first image 440 and the second image 445 along the epipolar lines 450. According to an embodiment the epipolar lines 450 are used as corresponding lines in order to obtain the disparity information concerning the first image 440 and the second image 445, as for each epipolar line 450 within the first image 440 a corresponding epipolar line 450 exists within the second image 445.

Along the corresponding lines 350 intensity sum values are gathered for the first image 340 and the second image 345. By comparison of the intensity sum values, a displacement of the object due to the different image capturing positions can be determined. The displacement, also known as disparity, can be evaluated by standard techniques in order to obtain the depth information of the object 330. In this way a three-dimensional profile of the object 330 may be obtained, e.g., a surface profile of the object 330.

Calculating the intensity sum values from the first image 340 and the second image 345 takes only comparatively little computing power compared to conventional algorithms for determining the depth of a three-dimensional object from two-dimensional images. In contrast to conventional methods, which rely on high computing power for solving partial differential equations, the computing unit 390 calculates only intensity sums along corresponding lines 350 in the images 340, 345.

Due to the use of Helmholtz reciprocity, the resolution of the depth information, i.e. the resolution of a surface profile of an object, is as high as the resolution of the used imaging units. Hence, the resolution of all three dimensions, i.e., of the two-dimensional image and the depth information is the same. By contrast, in conventional depth reconstruction algorithms, which use patterned lights, to obtain the depth information, the resolution of the depth information is typically limited by the resolution of the structure used to generate the patterned light.

Additionally, due to the use of Helmholtz reciprocity the depth profile can be determined independently of the reflection properties of the material.

The optical system and/or the method according to one of the above embodiments deliver highly resolved depth information about an object, while considerably reducing the computing power for obtaining the depth information and without a need to take into account the reflection properties of the object.

The imaging units may have parallel optical axes as illustrated in FIG. 3A. According to the embodiment illustrated in FIG. 4A, the imaging units of the optical system are tilted with respect to each other. The location and the orientation of the imaging units may be arbitrary as long as they have an overlapping field of view and are separated from each other by a non-zero baseline. Then, typically the corresponding lines 450 are not horizontal lines as shown in FIG. 3B, but are also tilted and an integration along these tilted lines or over fan-shaped areas within the first image and the second image including the tilted lines may retrieve depth information, respectively.

In order to be able to identify corresponding lines 450 and to obtain intensity sum values along the corresponding lines 450 the first and the second images 440, 445 may be rectified such that rectified images are obtained whose image planes are parallel to each other. For such rectified images the corresponding lines 450 may be parallel, horizontal epipolar lines within the images. Then, Helmholtz identity implies that the line integral over an object visible on both the first image 440 and the second image 445 is identical in the absence of noise. A computing unit connected to the optical system may perform rectification using standard techniques.

According to another embodiment the intensity information contained in the first image and the second image may be normalized in order to obtain the same cumulative normalized intensity for at least one patch of the scene imaged in the first image and the second image, wherein the patch is visible both in the first image and the second image. As a result of normalization the area integral of an object or patch of an object, which is visible in a pair of a first and a second image, becomes equal in the absence of noise.

Normalization may include applying for each pixel a respective weighting factor to the intensity information contained in the first image and the second image in order to obtain a normalized intensity information. The weighting factors may be determined analytically, e.g. by assuming a pin hole camera model and a point source or by a ray-tracing simulation of an optical model of the Helmholtz imaging setup.

Figure 4B:
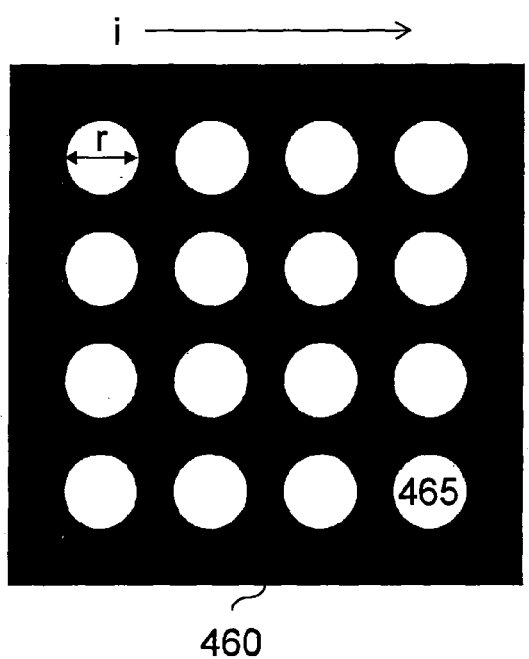
FIGS. 4B and 4C are schematic block diagrams of a calibration setup of an optical system according to an embodiment.
Figure 4C:
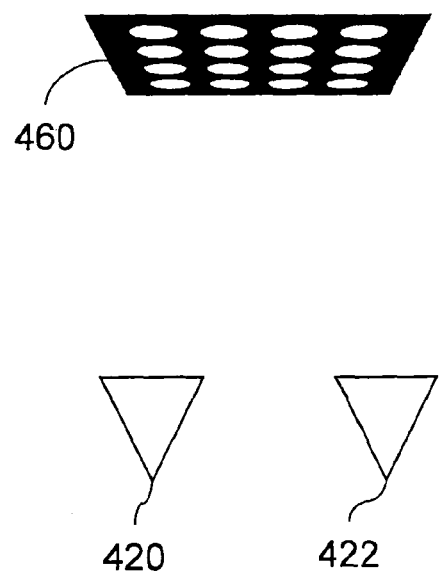

According to another embodiment the weighting factors may be determined by a calibration procedure for each imaging unit 420, 422 as illustrated in FIGS. 4B and 4C. During the calibration procedure a calibration pattern 460 as illustrated in FIG. 4B is captured by the imaging units 420, 422 of the optical system. The calibration pattern 460 may include a pattern of bright small circular patches 465 of radius r before a dark background. Alternatively, small square patterns, a checkerboard pattern, line-spaced patterns or patterns showing other contrasting features may be used.

Given a pair of rectified first and second images which contain intensity information $I_L$ and $I_R$ of the calibration pattern facing the imaging units 420, 422 at a constant distance Z, by using the Helmholtz identity the weights $w_L$ and $w_R$ may be chosen in order to satify $$\iint_{\Omega_{ij}} w_L(x,y) I_L(x,y) d\Omega_{ij} = \iint_{\Omega_{ij}} w_R(x,y) I_r(x,y) d\Omega_{ij} = \pi r^2 / Z^2,$$

with $\Omega_{ij}$ being the area of the patch 465 at position (i,j) within the calibration pattern 460, where "i" denotes the $i^{th}$ column and "j" the $j^{th}$ row of the calibration pattern.

If the circular patches of radius r of the calibration pattern are sufficiently small, the weight sampled at the position $(x_i, y_i)$, may be estimated by $$w_L(i,j) \iint_{\Omega_{ij}} I_L(x,y) d\Omega_{ij} = 1$$

with an analogous formula holding for $w_R(i,j)$.

The weighting function at pixel level may then be obtained by interpolation from the weights $w_L(i,j)$ and $w_R(i,j)$.

Figure 4D:
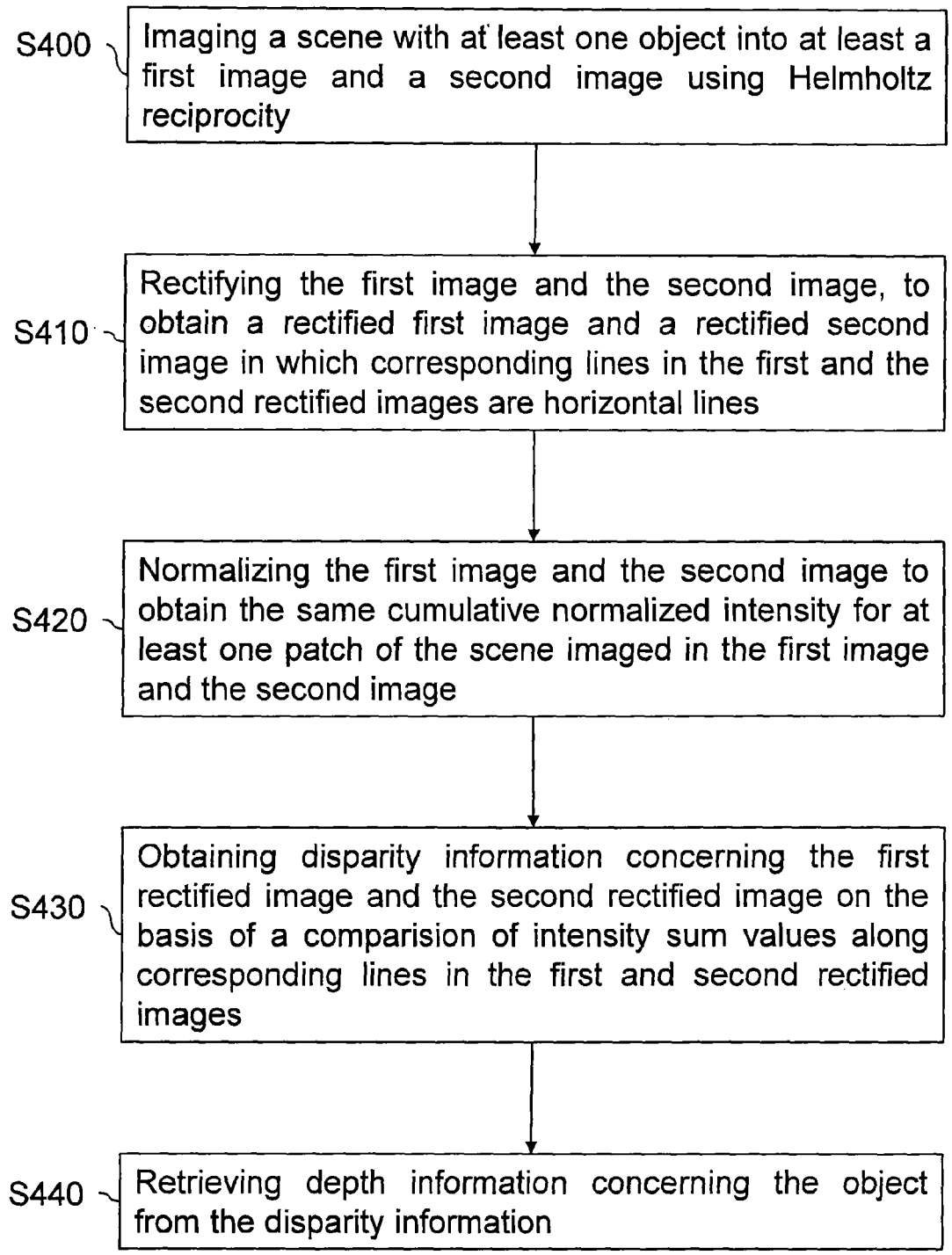
FIG. 4D is a schematic flow chart of a method of operating an apparatus including an optical system using Helmholtz reciprocity according to another embodiment including rectification and normalization.

FIG. 4D refers to a method of operating an apparatus including an optical system capturing a first image and a second image using Helmholtz reciprocity to obtain depth information concerning an object in the imaged scene, wherein the method takes into account rectification and normalization of the first image and the second image.

At S400 a scene with at least one object is imaged into at least a first image and a second image using Helmholtz reciprocity.

At S410 the first image and the second image are rectified in order to obtain a rectified first image and a rectified second image in which corresponding lines in the first and the second rectified image are horizontal lines. For example stereo rectification means may be applied to correct lens distortion and to align epipolar lines within the first image and the second image by aligning the focal planes of the first and the second images.

At S420 the first image and the second image are normalized to obtain the same cumulative normalized intensity for at least one patch of the scene, which is imaged in the first image and the second image and which is visible in the first image and the second image. Normalization may be performed before or after rectification. By performing the image normalization the radiance values of the imaging units used for imaging the first image and the second image may be converted into intensity sum values satisfying the Helmholtz identity.

According to another embodiment a weighting function used to normalize the first and the second image is obtained in a step of calibrating the imaging units used to capture the first image and the second image.

At S430 disparity information concerning the first image and the second image is obtained on the basis of a comparison of intensity sum values along the corresponding lines in the first image and the second image.

At S440 depth information concerning the object is retrieved from the disparity information.

In what follows it is assumed that all images captured by imaging units are rectified and normalized. According to other embodiments rectification and normalization is not performed.

FIG. 5 refers to a method for obtaining the depth information on the basis of the captured and, if applicable, rectified and/or normalized images obtained by using Helmholtz reciprocity.

At S500 in the first image intensity is integrated along straight lines in order to obtain intensity sum profiles of the first image, i.e. for each of the straight lines the integral of the intensity profile along the straight line is calculated as the intensity sum profile.

At S510 in the second image intensity is integrated along straight lines that correspond to the first lines, in order to obtain intensity sum profiles of the second image, i.e. for each of the straight lines the integral of the intensity profile along the straight line is calculated as the intensity sum profile.

Then the disparity information concerning the first image and the second image is obtained on the basis of a comparison of the obtained intensity sum profiles.

To this purpose, at S520 corresponding intensity sum profiles of the first and the second image are selected. An intensity sum profile of the first image corresponds to an intensity sum profile of the second image if it is obtained by integrating the intensity in the first image on a line corresponding to the line along which the intensity in the second image has been integrated.

At S530 in the selected intensity sum profile of the first image for each value of integrated intensity a first position on the integration path within the first image is determined at which the value of integrated intensity is reached. In the selected intensity sum profile of the second image for each value of integrated intensity a second position on the integration path within the second image is determined at which the value of integrated intensity is reached. According to the value of integrated intensity positions corresponding to this value of integrated intensity are determined on the integration path in the first and second images.

At S540 for each pair of intensity sum profiles and for each value of integrated intensity the first position on the integration path within the first image and the second position on the integration path within the second image are compared and the disparity between the first image and second image is determined based on this comparison.

At S550 the depth information concerning the object is retrieved from the disparity information obtained by comparing the first and the second position.

Figure 6:
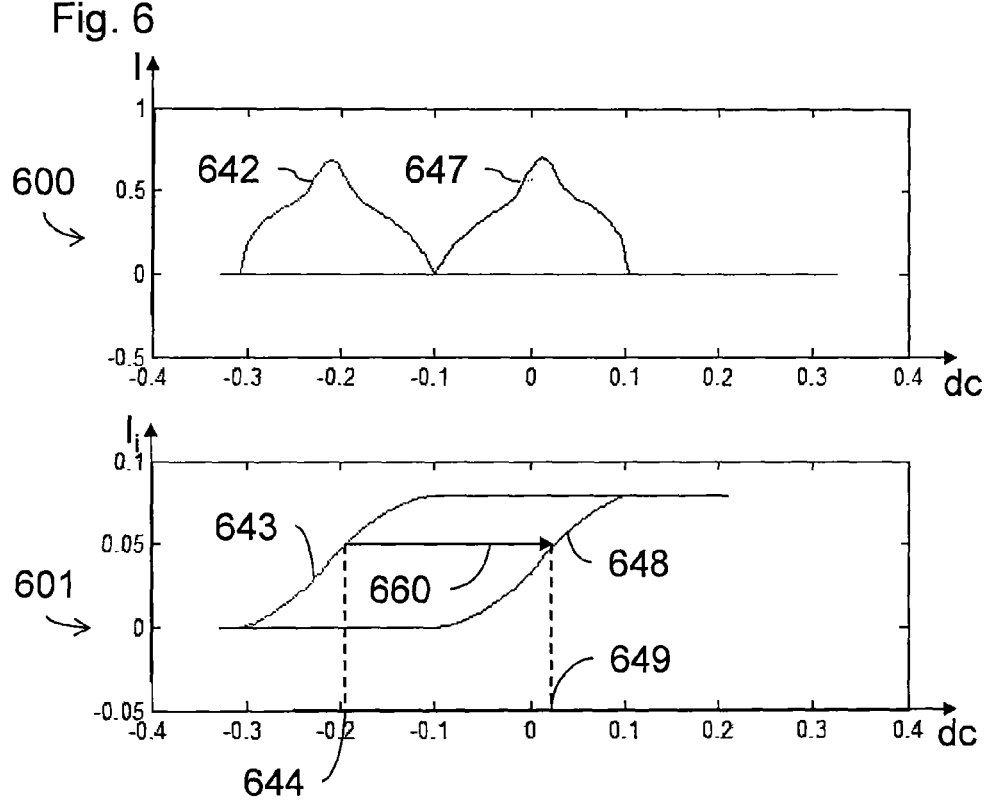
FIG. 6 are schematic diagrams of image intensity profiles and cumulative intensity profiles for illustrating the calculation of disparity information according to an embodiment.

FIG. 6 illustrates the above mentioned method for obtaining the disparity. The upper half of FIG. 6 is an intensity diagram 600 for the first image and the second image showing intensity I with respect to the direction cosine dc. A first intensity profile 642 shows the intensity distribution along a line within the first image, and a second intensity profile 647 shows the intensity distribution along a corresponding line in the second image.

The lower part of FIG. 6 is a diagram of the integrated intensity 601 showing integrated intensity $I_i$ against the direction cosine dc. A first intensity sum profile 643 of the first image is the graph of the integral of the first intensity profile 642. A second intensity sum profile 648 of the second image is the graph of the integral of the second intensity profile 647.

The first intensity sum profile 643 reaches a given value of integrated intensity, e.g. 0.05 in FIG. 6, at a first position 644 differing by a distance 660 from a second position 649 at which the second intensity sum profile 648 reaches the given value. The distance 660 directly corresponds to the disparity between the first image and the second image, subject to that Helmholtz reciprocity holds between the first image and the second image. Hence, a computational simple way can be used to obtain disparity information concerning an object from which then depth information may be retrieved by a standard procedure.

According to the embodiments described above an intensity sum calculated along corresponding lines within first and second images is used in order to determine disparity information. From the disparity information depth information concerning an object is obtained. However, the Helmholtz reciprocity condition defines partial differential equations for which the solution is not unique if no further boundary conditions apply. Hence, by merely integrating without specifying an integration boundary may result in a multitude of solutions for the searched disparity. Also other methods of obtaining depth information such as variational or numerical solving techniques of the partial differential equations resulting from the Helmholtz reciprocity may use boundary conditions in order to retrieve the depth information unambiguously.

Before integrating intensity information of the first image and the second image, a preprocessing of the first image and the second image may detect dark and/or contrasting regions within a scene or portions within the scene which are shadowed. The dark and/or contrasting regions may serve as boundaries for an integration path. The intensities may be scaled by different scale factors such that the total integrals over the images multiplied by the respective scale factors become equal and constant to enforce the boundary conditions at the end points of an integration path.

If more than two boundary conditions are available, a partial integration may be performed and a matching of the partial integral within the first and the second image may be obtained by scaling the respective integrals with scaling factors. Multiple boundaries may, for example, be available for multiple objects in front of a black or distant background, or if structured light or fringe projection is used to illuminate the scene. The structured light partitions a surface of the object by shadowed regions.

It may be possible that an ambiguity concerning the disparity remains while using the methods or optical systems according to one of the above embodiments. For example, if the objects imaged by the optical systems according to the above embodiments are extended objects, which do not allow for a sharp contrast against a background and do not itself contain any contrasting features, e.g. a white plane, another embodiment provides additional boundaries within the images in order to be able to obtain meaningful intensity sum values, from which disparity information may be obtained unambiguously.

For example, when integrating the intensity along corresponding lines such as epipolar lines, it is desirable to provide at least one identical reference point along both integrations in the first image and the second image, respectively. Such a reference point may be a contrasting feature within the image itself or a contrast between the object and a background as described above.

Figure 7A:
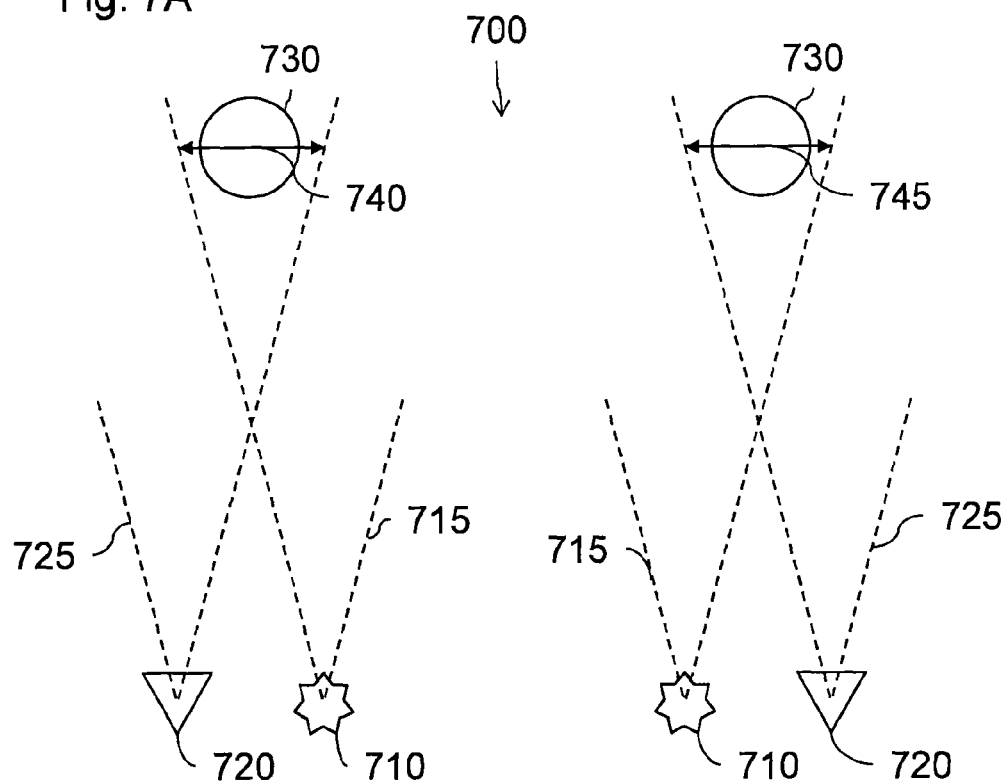
FIG. 7A is a schematic block diagram of an optical system imaging a scene by using Helmholtz reciprocity according to an embodiment.

FIG. 7A refers to an optical system 700 inherently providing such reference points. The optical system 700 includes an illumination unit 710 and an imaging unit 720, which may be exchanged with each other in order to image a scene including at least one object 730 into a first image 740 and a second image 745 illustrated in FIG. 7B.

Figure 7B:
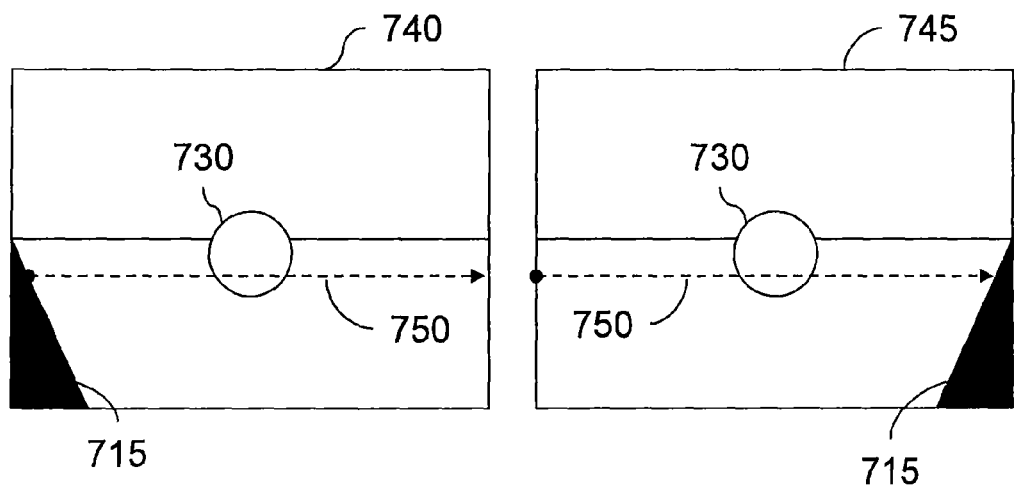
FIG. 7B schematically illustrates images imaged by the optical system of FIG. 7A.

The illumination unit 710 emits light only into a light emitting solid angle 715, i.e. into a light cone defined by the solid angle at the apex at the illumination unit 710. The imaging unit 720 captures objects, which reflect light into a light receiving solid angle 725, i.e. a cone defined by the solid angle at the apex at the imaging unit 720. The light receiving solid angle 725 of the imaging unit 720 is at least as large as the light emitting solid angle 715 of the illumination unit 710. Then, a boundary of the light emitting solid angle 715 is present in the first image 740 as well as in the second image 745 as illustrated in FIG. 7B.

Hence, using the combination of light emitting solid angles 715 and light receiving solid angles 725 it is ensured that the region imaged by the imaging unit 720, which is not illuminated by the light emitting solid angle 715 serves as contrasting region within the first image 740 and the second image 745 and hence provides a suitable boundary for an integration path 750 within the first image 740 and the second image 745. The integration path 750 in the first image 740 starts at the boundary of the light emitting solid angle 715 and ends at the boundary of the light receiving solid angle 725, i.e. at the boundary of the first image 740. In the second image 745 the corresponding integration path starts at the boundary of the light receiving solid angle, i.e. at the boundary of the second image 745 and ends at the boundary of the light emitting solid angle 715. Only mutually visible parts of the object 730 are captured by the imaging unit 720 within the first image 740 and the second image 745. Due to Helmholtz reciprocity, the intensity sum along the integration path in the two images is equal, which allows for a unique determination of disparity information. Hence, the optical system 700 provides two integration paths 750 within the first image 740 and the second image 745, wherein the two integration paths 750 allow for obtaining intensity sum profiles from which an unambiguous disparity information may be deduced.

According to another embodiment, instead of interchanging the illumination unit 710 and the imaging unit 720 as illustrated in FIG. 7A, a plurality of illumination units and imaging units may be used to capture at least the first image and the second image. Then, it may be sufficient that a light emitting solid angle of the illumination unit used to illuminate the first picture is smaller than or equal to a light receiving solid angle of the imaging unit used to capture the second picture. The size of a light receiving solid angle of the imaging unit used to capture the first picture is not restricted by the light emitting solid angle of the illumination unit used to illuminate the first picture and the size of a light emitting solid angle of the illumination unit used to illuminate the second picture is not restricted by the light receiving solid angle of the imaging unit used to capture the second picture The integration paths 750 through the first image 740 and the second image 745 may extend across the whole width of the first and second images 740, 745. When integrating the intensity of the first image 740 and the second image 745 across the whole width of the images 740, 745 eventual noise produced during capturing of the images 740, 745 within the imaging unit 720 will accumulate along the integration paths 750. Hence, the intensity sum values at the end of the integration path 750, i.e. intensity sum values corresponding to points on the object at the end of the integration path 750, may be more distorted than intensity sum values close to the fixed starting boundary. This may deteriorate the reconstruction of depth information of the object 730 in regions far from the starting boundary.

According to an embodiment the light emitting solid angle 715 for illuminating the scene may be smaller than the corresponding light receiving solid angle 725 used to capture the illuminated scene as, e.g., the first image. For example, the light emitting solid angle 715 may be of size A, while the light receiving solid angle 725 may be of size B with A≤B. When capturing the Helmholtz reciprocal image, e.g. as the second image, the light receiving solid angle 725 may be reduced to the size A, while the light emitting solid angle is at least of size A. The reduction may be performed by a hardware component such as an optical element, e.g. an aperture, or by an applied software, e.g. a bitmap which removes a portion of the image captured by the imaging unit 710. Then, in the first and second images 740, 745 a considerable portion of the images 740, 745 will be dark while only a small portion is visible. A boundary of this small visible region within the first and the second image 740, 745 may then serve as a point of reference for determining intensity sum values along corresponding lines, e.g. it may serve as starting point for integration along corresponding epipolar lines. As only small regions are illuminated, cumulation of noise along the corresponding lines will be small and deterioration of the depth information due to noise will be reduced.

In order to obtain depth information of the whole imaged scene, the light emitting solid angle 715 is scanned over the scene including the object 730, while in the reciprocal image the light receiving angle 725 is restricted in accordance with the preceding restriction of the light emitting angle 715. Then, the depth information may be obtained patch-wise in order to obtain low-noise depth information for the whole image.

Figure 8A:
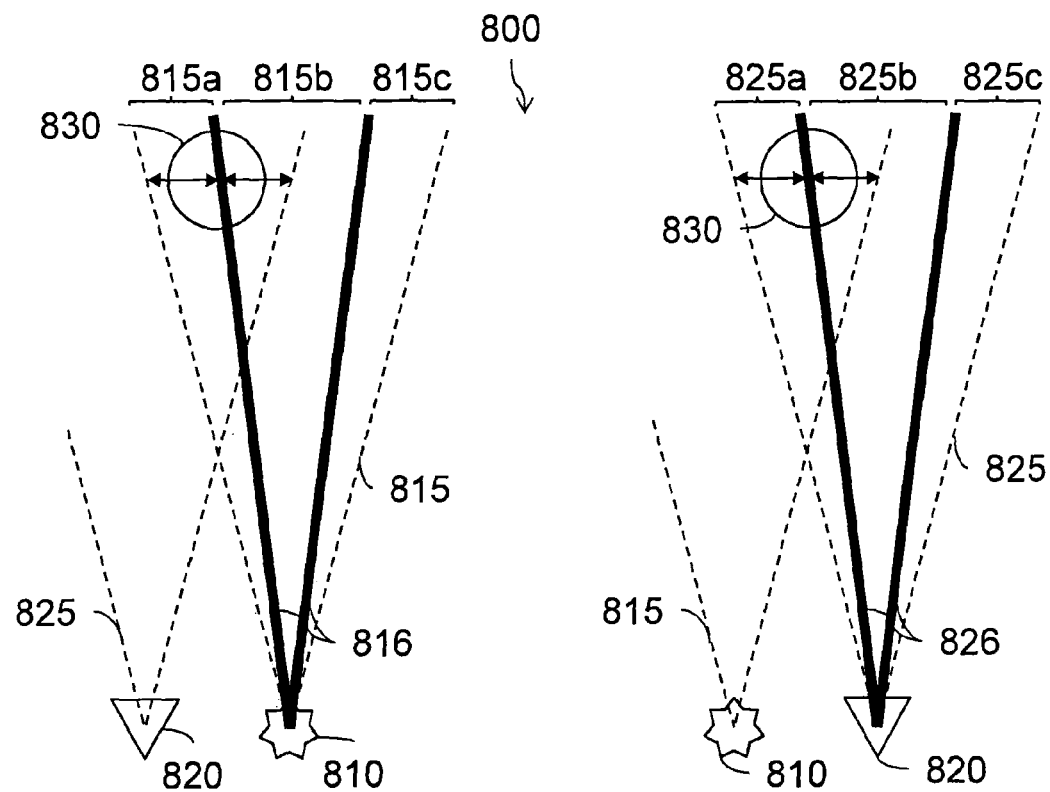
FIG. 8A is a schematic block diagram of an optical system imaging a scene by using Helmholtz reciprocity according to another embodiment.

According to an embodiment of an optical system 800 as illustrated on the left side of FIG. 8A a light emitting solid angle 815 of an illumination unit 810 emits light into a plurality of light emitting solid angles 815a, 815b, 815c. The corresponding imaging unit 820 may receive light from a single light receiving solid angle 825. Each of the light emitting solid angles 815a, 815b, 815c is at most as large as the light receiving solid angle 825 of the imaging unit 820. The light emitting solid angles 815a, 815b, 815c are separated by shadowed regions 816. The shadowed regions 816 are regions to which no light is emitted from the illumination unit 810. The shadowed regions 816 may, for example, be produced by apertures or blocking elements placed within a light path of light emitted from the illumination unit 810. The light receiving solid angle 825 may be selected such that the imaging unit 820 captures at least one shadowed region 816. The configuration illustrated on the left side of FIG. 8A may capture the first image 840 illustrated on the left side of FIG. 8B.

Figure 8B:
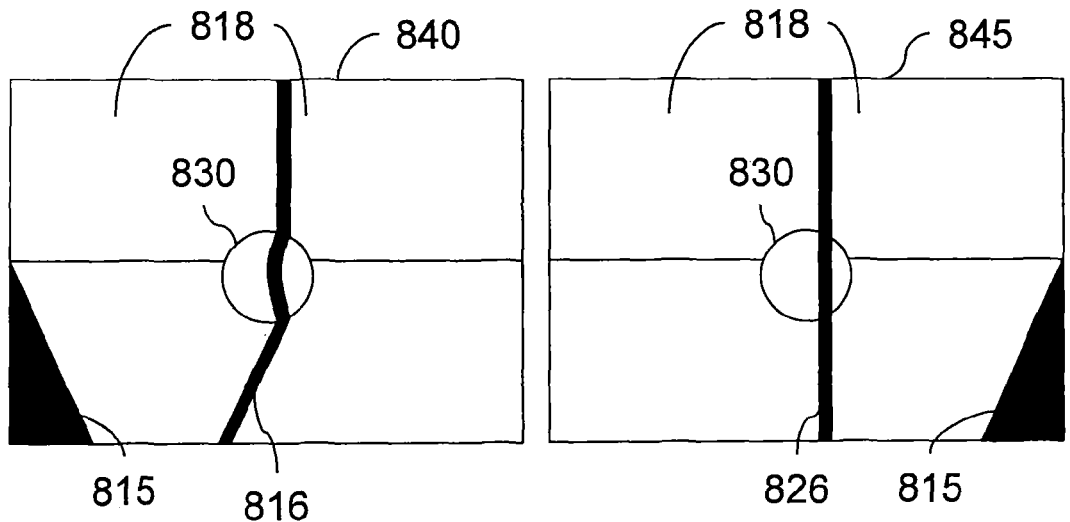
FIG. 8B schematically illustrates images imaged by the optical system of FIG. 8A.

To capture the second image 845 illustrated on the right side of FIG. 8B the size of the light emitting solid angle 815 may be sufficiently large, e.g. large enough to illuminate the whole scene or the object 830. The light receiving solid angle 825 may be separated by non-imaging region 826 into a plurality of light receiving solid angles 825a, 825b, 825c, which correspond in size and shape to the plurality of light emitting solid angles 815a, 815b, 815c. The non-imaging regions 826 may be obtained by hardware, e.g. by optical elements, such as apertures, being placed before the imaging unit 820, or by applying software, which filters out the image information within the non-imaging regions 826, as e.g. a bitmap applied to the imaging unit 820.

The shadowed regions 816 and the non-imaging regions 826 divide the first and the second images 840, 845 into a plurality of areas 818 illustrated in FIG. 8B. Each of the shadowed regions 816 and the non-imaging regions 826 imaged by the imaging unit 820 may provide an additional starting boundary condition. Partitioning the light emitting solid angle 815 for imaging the first image 840 into the plurality of light emitting solid angles 815a, 815b, 815c and the light receiving solid angle 825 for imaging the second image 845 into the plurality of light receiving solid angles 825a, 825b, 825c corresponding in size and shape to the plurality of light emitting solid angles 815a, 815b, 815c results in a partial integration based on the shadowed regions 816 in the first image 840 and the non-imaging regions 826 in the second image 845. By providing a plurality of solid angles 815a, 815b, 815c, 825a, 825b, 825c it is possible to segment the first and the second images 840, 845 into several areas on which integration along corresponding lines can be performed separately, which reduces the integration path length and therefore reduces the deterioration of the depth reconstruction by noisy intensity sum values. The optical system 800 according to the embodiment as illustrated in FIGS. 8A and 8B provides more reliable data for depth reconstruction.

According to the embodiments illustrated in FIGS. 8A and 8B three light emitting solid angles 815a, 815b, 815c and three light receiving solid angles 825a, 825b, 825c are used. According to other embodiments the optical system may use any other number of light emitting and light receiving solid angles, which correspond in size and shape to each other, e.g. are identically shaped and of the same size. The light emitting solid angles may be fixed or may be applied in a time-multiplexed manner in order to prevent ambiguities linked to a static light emitting pattern.

According to an embodiment, the light emitting solid angles 815a, 815b, 815c may divide the field of view into n segments. A sequence of n+1 images is captured to obtain the depth information. The time multiplexing of the n segments may for example be performed by a Hadamard sequence, which results in less noise in the resulting image and allows a shorter exposure time.

According to an embodiment the light emitting solid angle may be divided into four segments and an LCD light-modulator for a programmable aperture may be used, which opens and closes the four segments. Opening and closing may be performed according to the following sequence, where "1" denotes "segment open" and "0" denotes "segment closed" and the position refers to the respective segment of the light emitting solid angle:
T0: 0001
T1: 0010
T2: 0100
T3: 1000.

According to another embodiment instead of opening only one segment of the light emitting solid angle at a time, a Hadamard sequence denoted by H0 to H3 may be used and the images corresponding to a single open segment may be recovered by applying a linear transformation:
H0: 1111
H1: 1010
H2: 1100
H3: 1001.
Using such a Hadamard sequence may result in less noise in the resulting images or may allow for a shorter exposure time.

The time multiplexing may be performed by a fringe projection method using a line-spaced aperture and its reverse pattern. For example a sequence of opening and closing of six segments of a light emitting solid angle may be applied:
L0: 010101
L1: 101010.

In this case it may be sufficient to capture a sequence of three images. Phase ambiguities arising from the fringe projection method may be resolved from a stripe pattern of the emitted light by first using Helmholtz reciprocity to determine an approximate disparity and by using then fringe projection in order to find additional boundary points, which allow a final and more accurate determination of disparity information by using Helmholtz reciprocity again. According to another embodiment, Gray encoding may be used for time multiplexing.

Figure 8C:
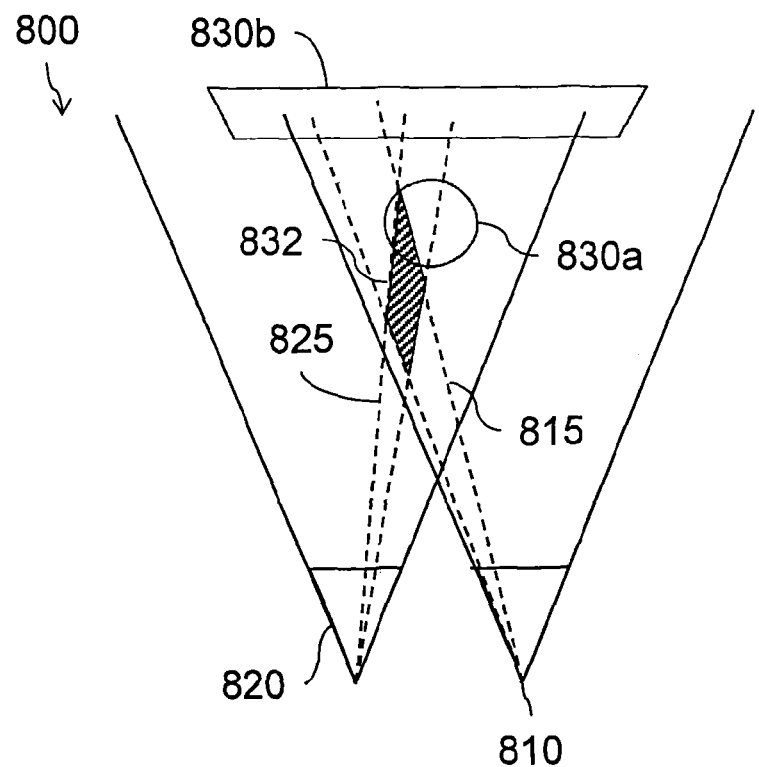
FIG. 8C is a schematic block diagram of an optical system imaging a scene by using Helmholtz reciprocity according to another embodiment.

FIG. 8C illustrates a scene where a first object 830a is arranged in front of a second object 830b. In this case the shadow of the first object 830a on the second object 830b may lead to ambiguities of the intensity sum values based on which a depth retrieval is performed. To solve these ambiguities it is desirable to provide an optical system and a method for operating the optical system by which depth information regarding several objects 830a, 830b can be obtained separately.

According to an embodiment of the optical system 800 illustrated in FIG. 8C the light emitting solid angle 815 of the illumination unit 810 and the light receiving solid angle 825 of the imaging unit 820 overlap in a region 832, when the first image is captured. By restricting the light emitting solid angle 815 and the light receiving solid angle 825 appropriately, the region 832 may include only one of the several objects 830a, 830b, e.g. the first object 830a as illustrated in FIG. 8C. Although the illumination unit 810 illuminates both the first object 830a and the second object 830b, the imaging unit 820 receives only light reflected from the first object 830a due to the restriction of the light receiving solid angle 825 towards the first object 830a. Thus, only information concerning the first object 830a is captured in the first image.

When the reciprocal second image is captured, the roles of the illumination unit 810 and the imaging unit 820 are exchanged. The illumination unit 810 illuminates only the first object 830a by a light emitting solid angle which corresponds, for example exactly, to the light receiving angle 825 used for capturing the first image. The imaging unit used for capturing the second image obtains only light reflected by the first object 830a. Hence, two images for which Helmholtz reciprocity holds are obtained, which contain only information on the first object 830a. From these images depth information which concerns only the first object 830a may be retrieved. In a similar manner images including only information on the second object 830b may be obtained. None of the imaging units 820 receives a shadow the first object 830a casts on the second object 830b and none of the two captured images contains the shadow. In this way, the disparity information concerning the first object 830a can be retrieved without ambiguities introduced by the shadow of the first object 830a on the second object 830b.

By repeating the image capture at different, appropriately selected light emitting and light receiving solid angles 815, 825, the scene may be scanned with the region 832 extending over different depth ranges with respect to the illumination and imaging units 810, 820. In this way, depth information of several objects may be retrieved separately from each other and ambiguities due to the presence of several objects may be resolved.

In order to scan the whole scene suitable time multiplexing such as Hadamard enconding, Gray encoding, or a fringe projection method may be used. For monochrome objects a colored projection instead of or additionally to time-multiplexing may be used. By using such time multiplexed light emitting and light receiving solid angles 815, 825 a space between the imaging units 820 and the scene including the objects 830a, 830b may be subdivided into a grid of spatial unit cells, also called "voxels" and a depth scan of the space may be applied by a programmable viewing depth and angle.

Figure 9A:
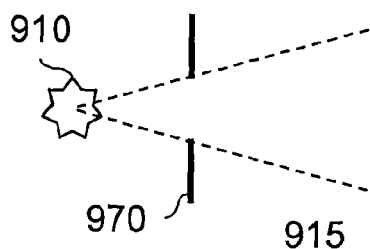
FIGS. 9A and 9B are schematic block diagrams of illumination units according to embodiments.
Figure 9B:
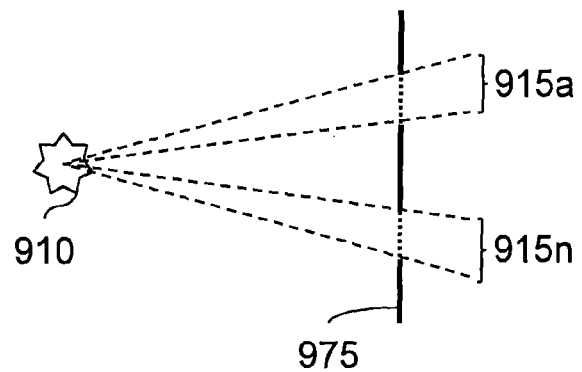

FIGS. 9A and 9B illustrate embodiments of illumination units 910 which may be used to produce the light emitting solid angles as described above with reference to FIGS. 7A to 8B.

FIG. 9A illustrates an illumination unit 910 whose light emitting solid angle 915 is defined by the opening of an aperture 970. The light emitting solid angle 915 can be set by a suitable aperture 970. For example, the aperture 970 may have a circular or elliptic, a rectangular or slit-like opening. The aperture 970 may also have a variable opening, which allows adjusting the light emitting solid angle 915 without exchanging the aperture 970. The aperture 970 may set the light emitting solid angle 915 of the illumination device 910 to be as large as or smaller than a light receiving solid angle of a corresponding imaging device. According to another embodiment more than one aperture 970 may define the light emitting solid angle 915.

FIG. 9B illustrates an illumination unit 910 emitting light into a plurality of light emitting solid angles 915a to 915n. By arranging a blocking structure 975 within a light path of the light emitted by the illumination unit 910 a part of the emitted light is absorbed and/or reflected by the blocking structure 975. The light which passed through the blocking structure 975 is emitted within the light emitting solid angles 915a to 915n. The blocking structure 975 may be a special kind of an aperture 970 having a plurality of openings, for example a grid or net shaped aperture.

The blocking structure 975 may be variable and may generate, for example, a time multiplexed light emitting pattern. Openings through which light is emitted can be adjusted variably over time in order to enable time multiplexed illumination of an object. For example, the blocking structure 975 may be a liquid crystal panel whose pixels are controlled electronically to provide light blocking regions and light transmitting regions varying over time.

In addition, the illumination unit 910 may also be configured to emit light, which wavelength varies over time or to emit light of different colors into different solid angles. For example, the blocking structure 975 may be light-transmissive for some, but not all colors. The variable blocking structure 975 may serve as a color filter and static or time multiplexed emission of light containing different colors may be used to provide reference points on corresponding lines within the first and the second image. For example, instead of using light entirely blocked by the blocking structure 975, light of two different colors may be used to generate reference points within the images.

The blocking structure 975 may be used to provide time multiplexed light structures according to the Hadamard encoding, the Gray encoding or a fringe projection method. The blocking structure 975 may be used to reduce cumulative noise by reducing the length of integration paths or to resolve ambiguities in the depth information resulting from the presence of several objects in the imaged scene.

According to another embodiment light emitting solid angles may be defined by a collimating optical device within an illumination unit. The collimating optical device may include various optical elements in order to adjust light emitting solid angles of the illumination unit. The collimating optical device may include a collimating lens for collimating light emitted from the illumination unit into parallel light, a diffusor for diffusing the parallel light, a reticle, e.g. an aperture or a variable blocking structure as described above with reference to FIGS. 9A and 9B and a projection optics for projecting the light towards an object. In the illumination unit including the collimating optical device light emitting solid angles are adjusted by a combination of several optical elements included within the collimating optical device. According to another embodiment the light emitting solid angle or the light receiving solid angle may be adjusted by any combination of optical elements such as lenses, mirrors, diffusors, projectors or the like.

According to another embodiment an illumination unit and an imaging unit may be combined within an optical device. Then, in order to enable imaging using Helmholtz reciprocity, the illumination unit and the imaging unit may be arranged with optical axes parallel and as close to each other as possible within the optical device.

Figure 10:
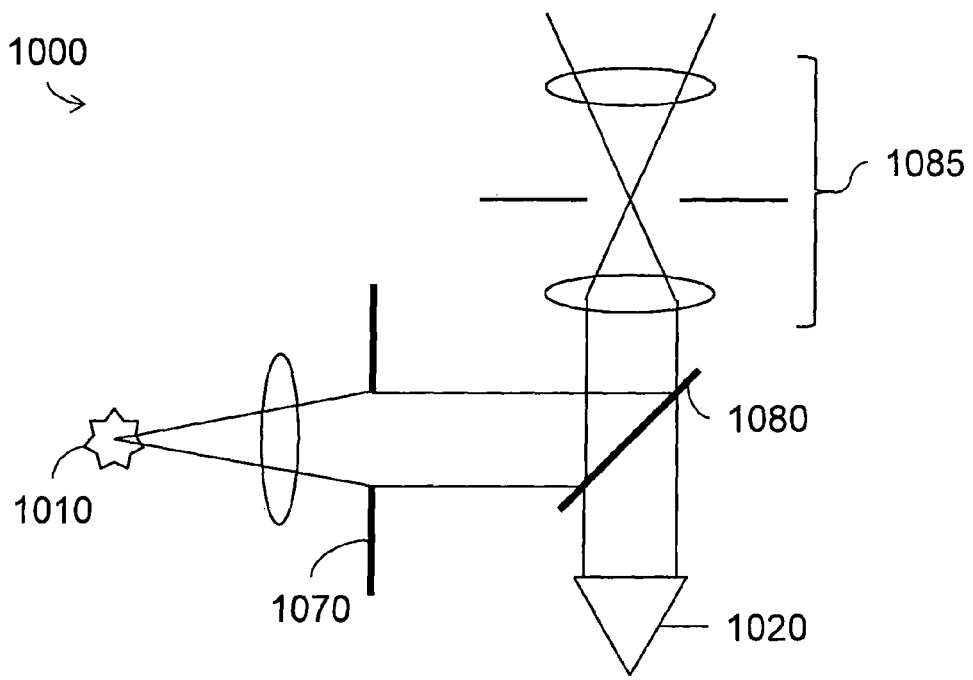
FIG. 10 is a schematic block diagram of an optical device with an illumination unit and an imaging unit according to an embodiment.

According to an embodiment as illustrated in FIG. 10 an optical device 1000 includes an optical element 1080 which aligns the optical axis of the illumination unit 1010 and the optical axis of the imaging unit 1020. In the illustrated embodiment, the optical element is a beam splitter 1080. The optical axes may also be aligned by other optical elements 1080, such as lenses or mirrors.

The optical device 1000 further includes an aperture 1070, which sets the light emitting solid angle of the illumination unit 1010 at most as large as the light receiving solid angle of the imaging unit 1020. The aperture 1070 is arranged between the illumination unit 1010 and the beam splitter 1080 in order to adjust the light emitting solid angle and the light receiving solid angle correctly. Between the beam splitter 1080 and the imaged scene an input/output optic 1085 passes the light emitted by the illumination unit 1010 towards the scene and passes light reflected from the scene towards the imaging unit 1020.

According to another embodiment a variable blocking structure as described with respect to FIG. 9B may replace the aperture 1070, such that the optical device 1000 may be used to emit time-multiplexed patterns of light.

According to an embodiment, an optical system includes at least two of the optical devices 1000 in order to image a scene using Helmholtz reciprocity. Then, while in the first optical device 1000 the illumination unit 1010 is active to illuminate the object, in the other optical device 1000 the imaging unit 1020 is active to capture a first image of the object. In order to capture a second image of the object, in the first optical device 1000 the illumination unit 1010 is switched off and the imaging unit 1020 is switched on, while in the second optical device 1000 the imaging unit 1020 is switched off and the illumination unit 1010 is switched on. By this procedure a reversal of the traveling direction of a light ray and hence Helmholtz reciprocity is obtained.

According to another embodiment, each optical device 1000 provides the same light emitting solid angle and light receiving solid angle, respectively, i.e. the light emitting solid angles of two different optical devices 1000 are the same and the light receiving solid angles of two different optical devices 1000 are the same. In this way, the same solid angles for light emission and light reception may be provided at the illumination and imaging positions of the different optical devices 1000. Hence, the optical devices 1000 can be fixedly installed, wherein the risk of a miss-alignment of the optical system during exchange of components of the optical system is reduced.

According to another embodiment an aperture or variable blocking structure within the optical devices 1000 may be controlled by software executed by a computing unit. Size and shape of the aperture of the optical devices 1000 including the illumination units 1010 and the imaging units 1020 should be consistent, such that a bitmap may be applied to mask captured reciprocal images instead of using hardware apertures in front of the illumination units 1010 and imaging units 1020. As the field of view of a pair of optical devices 1000 may have different aperture shapes, e.g. a first optical device 1000 may use a rectangular aperture for its illumination unit 1010 and its imaging unit 1020 and a second optical device 1000 may use a different, e.g. star shaped, aperture, the fields of view of the optical devices 1000 may be aligned by applying the bitmap to the optical devices 1000.

According to an embodiment a reticle or a Liquid Crystal Device (LCD) or a Liquid Crystal on Silicon Device (LCoSD) may be used as aperture or variable blocking structure of the illumination unit 1010 of a first optical device 1000. The same aperture may be applied to the imaging unit 1020 of a second optical device 1000, which is used to image the scene illuminated by the illumination unit 1010 of the first optical device 1000. Instead of using a hardware aperture, a software bitmap may select those pixels of the imaging unit 1020 which correspond to the aperture of the illumination unit 1010 as defined by the LCD used for example as the variable blocking structure. In order to obtain a bitmap representing the shape of the aperture of the illumination unit 1010, a calibration procedure may be used by projecting the aperture of the illumination unit 1010 to a plain perpendicular screen from which the imaging unit 1020 may capture the pattern of the aperture.

Figure 11:
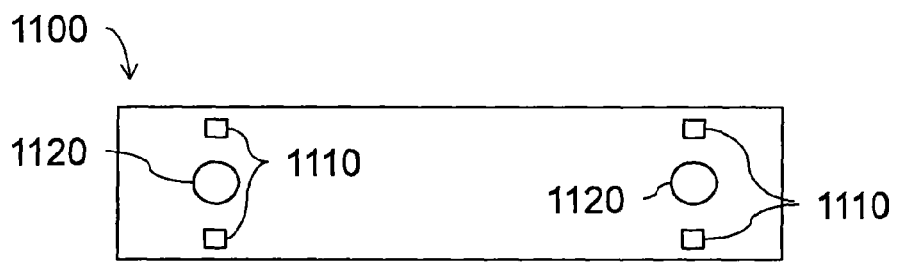
FIG. 11 is a schematic block diagram of an apparatus including an optical system for imaging a scene by using Helmholtz reciprocity according to an embodiment.

According to an embodiment as illustrated in FIG. 11, an electronic apparatus 1100 includes imaging units 1120 and illumination units 1110 symmetrically arranged around or close to the imaging units 1120. According to the embodiment of FIG. 11 two illuminations units 1110 are symmetrically arranged around each of the imaging units 1120, respectively. According to other embodiments, any other number of illumination units 1110 may surround the imaging units 1120. According to other embodiments, there may be any number of imaging units 1120 within the electronic apparatus 1100.

In order to enable imaging using Helmholtz reciprocity, the illumination units surrounding the imaging units 1120 are switched on and off alternately, while the imaging unit 1120 images an object. For example, the two illumination units 1110 next two one imaging unit 1120 illustrated in FIG. 11 are switched on and off such that only one illumination unit 1110 emits light.

The imaging unit 1120 may image the object from the same position, while the angle of the incident light changes for obtaining the first and second images. Although in this configuration the position of light emission and light reception are not exactly exchanged, due to the proximity of the illumination units 1110 to the imaging units 1120 illumination positions and imaging positions are sufficiently close to each other and Helmholtz reciprocity holds to a sufficiently good approximation. Hence, according to the embodiment illustrated in FIG. 11, it is possible to provide a simplified setup for image capture using Helmholtz reciprocity. The simplified setup may be sufficient for approximate depth detection of possibly moving objects. The simplified setup may be used in applications such as biometry or three-dimensional media interfaces, by way of example.

Figure 12:
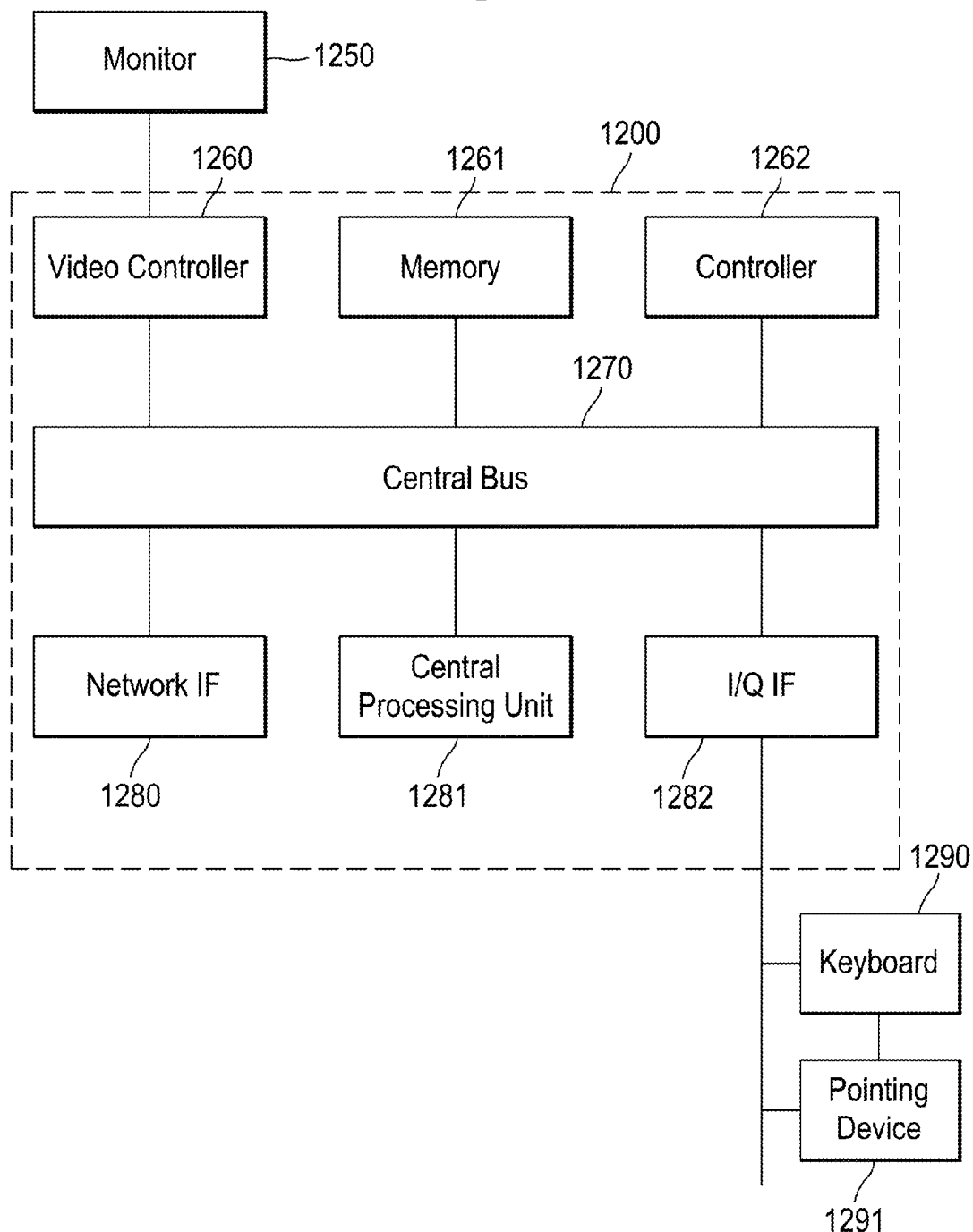
FIG. 12 is a schematic block diagram of a computing unit according to another embodiment.

FIG. 12 is a block diagram of a computing unit 1200 embodying aspects of this disclosure including aspects involving a computer utilized to determine depth information concerning an object imaged into at least two images using Helmholtz reciprocity. The processes, algorithms and electronically driven systems described herein can be implemented via a discrete control device or computing system consistent with the structure shown in FIG. 12. Such a system is described herein as a computing unit 1200.

The computing unit 1200 may be implemented using a microprocessor or its equivalent, such as a central processing unit 1281 (CPU) or at least one application specific processor ASP. The microprocessor utilizes a computer readable storage medium, such as a memory 1261 (e.g., ROM, EPROM, EEPROM, flash memory, static memory, DRAM, SDRAM, and their equivalents), that control the microprocessor to perform and/or control the process of retrieving depth information of an object. Other storage mediums can be controlled via a controller, such as a disk controller 1262, which controls a hard disk drive or optical disk drive.

The microprocessor or aspects thereof, in an alternate embodiment, can include or exclusively include a logic device for augmenting or fully implementing the retrieval of depth information as described above. Such a logic device includes, but is not limited to, an application-specific integrated circuit (ASIC), a field programmable gate array (FPGA), a generic-array of logic (GAL), and their equivalents. The microprocessor may be a separate device or a single processing mechanism.

A video controller 1260 may or may not use the retrieved depth information to render a 3D image that can be displayed on a monitor 1250. The video controller 1260 may include a graphic processing unit for improved computational efficiency. Additionally, an I/O (input/output) interface 1282 may be provided for inputting data from a keyboard 1290 or a pointing device 1291 for controlling parameters of the various processes and algorithms of this disclosure can be connected to the I/O interface to provide additional functionality and configuration options, or control display characteristics. The monitor 1250 may include a touch-sensitive interface to a command/instruction interface. Other peripherals can be incorporated, including a scanner or a web cam when image-based data entry is used.

The components of the processing system 1200 may be coupled to a network such as the Internet or a local intranet, via a network interface 1280 for the transmission or reception of data, including controllable parameters. The network provides a communication path to a mobile device, which can be provided by way of packets of data. A central BUS 1270 may connect components of the processing system 1200 with each other and provides at least one path for digital communication between them.

According to an embodiment the image data obtained by imaging an object by an optical system according to above described embodiments using Helmholtz reciprocity may be provided to the processing system 1200 via the I/O interface 1282. According to another embodiment, image data are provided to the processing system 1200 via the network interface 1280.

In so far as embodiments have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment.

(1) An optical system, including an illumination unit and an imaging unit configured to image a scene including at least one object into a first image and a second image using Helmholtz reciprocity; wherein the illumination unit is configured to emit light into at least one light emitting solid angle;

the imaging unit is configured to receive light from a light receiving solid angle; and the light receiving solid angle is at least as large as each of the light emitting solid angles.

(2). The optical system according to (1), wherein the illumination unit includes at least one aperture whose opening defines the light emitting solid angle.

(3) The optical system according to (1) or (2), wherein the light emitting solid angles of the illumination unit are obtained by emitting the light through a variable blocking structure.

(4) The optical system according to any one of (1) to (3), wherein
an optical device includes the illumination unit and the imaging unit.

(5) The optical system according to (4), wherein
an optical element within the optical device is configured to align an optical axis of the illumination unit and an optical axis of the imaging unit.

(6) The optical system according to any one of (1) to (5), further including
a plurality of illumination units arranged symmetrically around the imaging unit.

(7) An apparatus including
an optical system with an illumination unit and an imaging unit configured to image a scene including at least one object into at least a first image and a second image by using Helmholtz reciprocity; and
a computing unit configured to obtain disparity information concerning the first image and the second image on the basis of a comparison of intensity sum values along corresponding lines in the first image and the second image and configured to retrieve depth information concerning the object from the disparity information.

(8) A method for operating an apparatus including an optical system, the method including:
imaging a scene including at least one object into a first image and a second image using Helmholtz reciprocity;
obtaining disparity information concerning the first image and the second image on the basis of a comparison of intensity sum values along corresponding lines in the first image and the second image; and
retrieving depth information concerning the object from the disparity information.

(9) The method according to (8), wherein the corresponding lines are corresponding epipolar lines.

(10) The method according to any one of (8) to (9), wherein obtaining the disparity information includes:
integrating in the first image an intensity along the corresponding lines, to obtain intensity sum profiles of the first image;
integrating in the second image the intensity along the corresponding lines, to obtain intensity sum profiles of the second image.

(11) The method according to (10), wherein determining the disparity includes the steps of:
selecting for each pair of corresponding lines of the first image and the second image the corresponding intensity sum profile of the first image and the corresponding intensity sum profile of the second image;
determining from the selected intensity sum profile of the first image for each value of integrated intensity a first position on the integration path within the first image at which the value of integrated intensity is reached;
determining from the selected intensity sum profile of the second image for each value of integrated intensity a second position on the integration path within the second image at which the value of integrated intensity is reached;
determining for each value of integrated intensity the disparity from the first position and the second position.

(12) The method according to any one of (8) to (11), wherein at least one end of the corresponding lines within the first image and the second image is predetermined by illuminating the object

(13) The method according to any one of (8) to (12), wherein imaging the scene includes:
emitting light into at least one light emitting solid angle to illuminate the object; and
receiving light reflected from the object from a light receiving solid angle, which is at least as large as each of the light emitting solid angles; wherein
at least one end of the corresponding lines within the first image and the second image is predetermined by a boundary of the at least one light emitting solid angle mapped to the light receiving solid angle.

(14) The method according to any one of (8) to (13), including the step of:
rectifying the first image and the second image, to obtain a rectified first image and a rectified second image in which the corresponding lines are horizontal lines.

(15) The method according to any one of (8) to (14), including the step of: normalizing the first image and the second image, to obtain the same cumulative normalized intensity for at least one patch of the scene imaged in the first image and the second image that is visible in the first image and the second image.

(16) The optical system according to (3), wherein the variable blocking structure is a liquid crystal display device.

(17) The electronic apparatus according to (7), wherein the corresponding lines are corresponding epipolar lines.

(18) The electronic apparatus according to (7) or (17), wherein the computing unit is configured to obtain the disparity information by:
integrating in the first image an intensity of the captured light along the corresponding lines, to obtain intensity sum profiles of the first image;
integrating in the second image the intensity of the captured light along the corresponding lines, to obtain intensity sum profiles of the second image.

(19) The electronic apparatus according to (18), wherein the computing unit is configured to determine the disparity by:
selecting for each pair of corresponding lines of the first image and the second image the corresponding intensity sum profile of the first image and the corresponding intensity sum profile of the second image;
determining from the selected intensity sum profile of the first image for each intensity sum value a first position on the integration path within the first image at which the intensity sum value is reached;
determining from the selected intensity sum profile of the second image for each intensity sum value a second position on the integration path within the second image at which the intensity sum value is reached;
determining for each intensity sum value the disparity from the first position and the second position.

(20) The electronic apparatus according to (7) or any one of (17) to (19), wherein at least one end of the corresponding lines within the first image and the second image is predetermined by the first illumination unit and the second illumination unit.

The invention claimed is:
1. An apparatus comprising
an optical system according with an illumination unit and an imaging unit configured to image a scene including at least one object into at least a first image and a second image by using Helmholtz reciprocity; and
a processor configured to obtain disparity information concerning the first image and the second image on the basis of a comparison of intensity sum values along corresponding lines in the first image and the second image and configured to retrieve depth information concerning the object from the disparity information, wherein the processor is configured to obtain the disparity information by:
  integrating in the first image an intensity of the captured light along the corresponding lines, to obtain intensity sum profiles of the first image;
  integrating in the second image the intensity of the captured light along the corresponding lines, to obtain intensity sum profiles of the second image;
  selecting for each pair of corresponding lines of the first image and the second image the corresponding intensity sum profile of the first image and the corresponding intensity sum profile of the second image;
  determining from the selected intensity sum profile of the first image for each intensity sum value a first position on the integration path within the first image at which the intensity sum value is reached;
  determining from the selected intensity sum profile of the second image for each intensity sum value a second position on the integration path within the second image at which the intensity sum value is reached; and
  determining for each intensity sum value the disparity from the first position and the second position.

2. The apparatus according to claim 1, wherein the illumination unit comprises at least one aperture whose opening defines a light emitting solid angle.

3. The apparatus according to claim 1 wherein light emitting solid angles of the illumination unit are obtained by emitting light through a variable blocking structure.

4. The apparatus according to claim 1, wherein an optical device comprises the illumination unit and the imaging unit.

5. The apparatus according to claim 4, wherein an optical element within the optical device is configured to align an optical axis of the illumination unit and an optical axis of the imaging unit.

6. The apparatus according to claim 1, further comprising a plurality of illumination units arranged symmetrically around the imaging unit.

7. The apparatus according to claim 3, wherein the variable blocking structure is a liquid crystal display device.

8. The apparatus according to claim 1, wherein the corresponding lines are corresponding epipolar lines.

9. The apparatus according to claim 1, wherein at least one end of the corresponding lines within the first image and the second image is predetermined by a first illumination unit and a second illumination unit included in the illumination unit.

10. A method for operating an apparatus including an optical system, the method comprising:
  imaging a scene including at least one object into at least a first image and a second image by using Helmholtz reciprocity;
  obtaining disparity information concerning the first image and the second image on the basis of a comparison of intensity sum values along corresponding lines in the first image and the second image; and
  retrieving depth information concerning the object from the disparity information, wherein
  obtaining the disparity information comprises
    integrating in the first image an intensity along the corresponding lines to obtain intensity sum profiles of the first image;
    integrating in the second image the intensity along the corresponding lines to obtain intensity sum profiles of the second image
    selecting for each pair of corresponding lines of the first image and the second image the corresponding intensity sum profile of the first image and the corresponding intensity sum profile of the second image;
    determining from the selected intensity sum profile of the first image for each value of integrated intensity a first position on the integration path within the first image at which the value of integrated intensity is reached;
    determining from the selected intensity sum profile of the second image for each value of integrated intensity a second position on the integration path within the second image at which the value of integrated intensity is reached; and
    determining for each value of integrated intensity the disparity from the first position and the second position.

11. The method according to claim 10, wherein the corresponding lines are corresponding epipolar lines.

12. The method according to claim 10, wherein at least one end of the corresponding lines within the first image and the second image is provided by illuminating the object.

13. The method according to claim 10, wherein imaging the scene comprises:
  emitting light into at least one light emitting solid angle to illuminate the object; and
  receiving light reflected from the object from a light receiving solid angle, which is at least as large as each of the light emitting solid angles; wherein
  at least one end of the corresponding lines within the first image and the second image is predetermined by a boundary of the at least one light emitting solid angle mapped to the light receiving solid angle.

* * * * *